United States Patent [19]

St. Angelo, Jr. et al.

[11] Patent Number: 4,839,958

[45] Date of Patent: Jun. 20, 1989

[54] METHOD OF USING A ROBOT FOR INSTALLING WEATHER STRIPPING IN A DOOR OR LIKE OPENING

[75] Inventors: Stephen St. Angelo, Jr., Rochester Hills, Mich.; George C. Carver, Albany; David W. Patterson, Duluth, both of Ga.; Owen K. Fremont, Rochester, Mich.

[73] Assignee: General Motors Corporation, Detroit, Mich.

[21] Appl. No.: 161,500

[22] Filed: Feb. 29, 1988

Related U.S. Application Data

[60] Division of Ser. No. 944,649, Dec. 22, 1986, Pat. No. 4,760,636, which is a continuation-in-part of Ser. No. 888,238, Jul. 18, 1986, Pat. No. 4,715,110.

[51] Int. Cl.$^4$ .............................................. B23P 11/02
[52] U.S. Cl. ......................................... 29/450; 29/430
[58] Field of Search ................ 29/451, 235, 701, 430; 414/744 A, 78.6; 901/36, 41

[56] References Cited

U.S. PATENT DOCUMENTS

| | | | |
|---|---|---|---|
| 4,578,851 | 4/1986 | Song | 29/235 |
| 4,620,354 | 11/1986 | Hess et al. | 29/701 X |
| 4,636,136 | 1/1987 | Nomura et al. | 414/744 A X |
| 4,653,166 | 3/1987 | Bright | 29/235 |

FOREIGN PATENT DOCUMENTS

| | | |
|---|---|---|
| 110156 | 6/1984 | European Pat. Off. |
| 2707332 | 8/1978 | Fed. Rep. of Germany |
| 2286029 | 4/1976 | France |

Primary Examiner—Charlie T. Moon
Attorney, Agent, or Firm—Ernest E. Helms

[57] ABSTRACT

The present invention disclosure provides for an apparatus and method for installing weather stripping in a body door opening. In its preferred embodiment the present disclosure provides a robot which can load itself from a weather stripping station, transfer the weather stripping to the body door opening, and install the weather stripping within the body door opening. The present disclosure also provides an end of arm tooling device for a robot above described. The present disclosure also includes a vehicle produced by the robot above described.

10 Claims, 3 Drawing Sheets

U.S. Patent  Jun. 20, 1989  Sheet 3 of 3  4,839,958

METHOD OF USING A ROBOT FOR INSTALLING WEATHER STRIPPING IN A DOOR OR LIKE OPENING

This application is a division of application Ser. No. 944,649, filed on Dec. 22, 1986, U.S. Pat. No. 4,760,636, which is a continuation-in-part of U.S. patent application St. Angelo et al, "Apparatus And Method Of A Robot For Installing Weather Stripping In A Door Or Like Opening", Ser. No. 888,238, filed July 18, 1986 now U.S. Pat. No. 4,715,110, and the disclosures of the above-noted application is incorporated herein in its entirety.

FIELD OF THE PRESENT INVENTION

The field of the present invention is that of an apparatus and method of installing weather stripping in door and like openings using a robot. The field of the present invention is also that of an end of arm tooling device (EOAT) for a robot which installs weather stripping in door and like openings.

DISCLOSURE STATEMENT

It is well known in the art to utilize weather stripping comprised of elastomeric materials to seal the openings in vehicles such as a door opening or trunk. The weather stripping used to seal the openings has a generally U-shaped cross sectional portion with interior barbs called the carrier. Transversely joined to the carrier is a tubular portion. To install the weather stripping the carrier of the weather stripping is press fitted over the sheet metal flange of the periphery of the vehicle opening with the tubular portion facing outward. The barbs of the carrier grab the sheet metal flange of the vehicle opening to retain the weather stripping in place. Over a period of time, the heat and exposure of the environment will cause the weather stripping to dry and shrink. Therefore, the weather stripping is oversized usually 2% greater in length than the peripheral length of the door opening to compensate for the future shrinkage.

Manual installation of the weather stripping includes manually placing a fixed length closed loop of weather stripping in the door opening and pounding the weather stripping in place using a rubber mallet. Since the installer selectively strikes only certain segments of the weather stripping with the mallet, the application of the weather stripping can sometimes be somewhat uneven. Also, excessive pounding can damage the weather stripping. Sometimes the weather stripping is then pushed down in a second operation with a manually held roller in an attempt to smooth out the weather stripping.

Since the weather stripping exceeds the linear length of the door opening, the weather stripping must be longitudinally compressed in certain areas of the door opening. It is more advantageous to place the longitudinally compressed portion of the weather stripping in the corner or curved sections of the door opening. The above helps to prevent the weather stripping from pulling away from the corner sections. However, since the weather stripping is pound onto the flange, the longitudinal compressed portions of the weather stripping are located on both the straight and curved sections of the door opening in a random manner.

SUMMARY OF THE INVENTION

To overcome the above-noted and other problems the present invention is brought forth. The present invention provides an apparatus and method of utilization of the same of a robot for installation of weather stripping in a body door or like opening. The present invention also provides an EOAT for use on the robot above-described. The present invention in its preferred embodiment provides a robot which can load the weather stripping from a loading station, transfer the weather stripping to the body opening, and then with a pressure roller install the weather stripping within a body door or like opening.

It is an object of the present invention to provide a robot which can install weather stripping into the opening of a vehicle or like body. It is also an object of the present invention to provide an EOAT for a robot as above-described. It is another object of the present invention to provide a method for installing weather stripping within a body door or like opening.

It is also an object of the present invention to provide a method of installing oversized weather stripping in an opening in a manner which places a greater proportion of the oversize in the corner sections of the opening than in the straight sections of the opening.

It is still another object of the present invention to provide a robot for installing weather stripping stored in a loading station into a body opening, the robot in combination comprising, an arm supported on a pedestal movable in both horizontal and vertical planes, a selectively operable gripper on the end of the arm to grab the weather stripping from the loading station to load the arm, a guide roller rotatably mounted to the end of the arm having a first position of engagement with the weather stripping to align the weather stripping and the guide roller having a second position out of engagement with the weather stripping, an idler roller on the end of the arm supporting the weather stripping generally opposite the guide roller in the first position of the guide roller, and a powered pressure roller relatively mounted on the end of the arm having variable rotational velocity and compliance with respect to the arm in two axes, the pressure roller receiving weather stripping from the guide roller and guiding the weather stripping and tracing the opening of the body whereby the weather stripping is affixed to the body opening.

It is yet still another object of the present invention to provide a method of loading an arm of a robot with weather stripping from a loading station wherein the robot has an EOAT with a pressure roller and a guide roller having a first position of engagement with the weather stripping and a second position out of engagement with the weather stripping and a selectively operable gripper to grab the weather stripping, the method including, contacting the weather stripping with the pressure roller, closing the gripper to grab the weather stripping, and translating the guide roller from the second position to the first position whereby the weather stripping is loaded to the robot arm.

It is still yet another object of the present invention to provide a method for utilizing a robot with an arm having a variable rotational velocity powered pressure roller to install oversized fixed lengths of weather stripping, stored in a loading station, and to a body opening, including generally straight sections and corner sections cumulatively linearly shorter than the fixed length of the weather stripping, the method in combination comprising, loading the robot arm with the fixed lengths one at a time, transferring the fixed length from the loading station to the opening, and interacting and tracing the pressure roller along the straight section at a first linear speed and at a first rotational speed and interacting and tracing the pressure roller along the curved section at a second linear speed lower than the first linear speed and at a second rotational speed greater than the first rotational speed whereby the fixed length is guided in a fix with the opening of the body and whereby the portion of the fixed length of weather stripping exceeding the linear length of the opening is installed in a compressed manner within the corners.

It is also yet another object of the present invention to provide a method for utilizing a robot with an arm and a variable rotational velocity pressure roller to install fixed lengths of weather stripping, stored in a loading station, into a body opening including generally straight sections and corner sections, the method including loading the robot arm with one of the fixed lengths, transferring the fixed length from the loading station to the body opening, interacting and tracing the pressure roller along a straight section at a first linear speed and at a first rotational speed and interacting and tracing the pressure roller along a corner section at a second linear speed differing from the first linear speed and at a second rotational speed differing from the first rotational speed whereby the fixed length is guided and affixed with the sections as the fixed length is installed into the body opening.

It is yet still another object of the present invention to provide a method for utilizing a robot with an arm having a variable rotational velocity motor powered pressure roller, including a clutch to selectively engage or disengage the pressure roller with the motor, to install one to three percent oversized fixed lengths of weather stripping, stored in a loading station, to a body opening including generally straight sections and corner sections cumulatively linearly shorter than the fixed length of the weather stripping, the method including loading the robot arm with one of the fixed lengths, transferring the fixed length from the loading station to the body opening, and, interacting and tracing the pressure roller along a straight section at a first linear speed and the clutch disengaging said pressure roller from the motor allowing said pressure roller to free wheel at a first rotational speed and interacting and tracing the pressure roller along a corner section at a second linear speed slower than the first linear speed and the clutch engaging the pressure roller with the motor powering the pressure roller at a second rotational speed greater than the first rotational speed whereby the fixed length is guided and affixed with the sections as the fixed length is installed into the body opening and whereby the portion of the fixed length of weather stripping exceeding the linear length of the opening is installed in a linearly compressed manner at the corner sections.

Furthermore, another object of the present invention is to provide a vehicle including a body with an opening having corner sections and generally straight sections of a first linear length, and a fixed length of elastomeric longitudinally compressible weather stripping of a second linear length greater than the first linear length affixed with the body opening whereby the amount of the fixed length greater than the first linear length is longitudinally compressed along the body opening corner sections.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
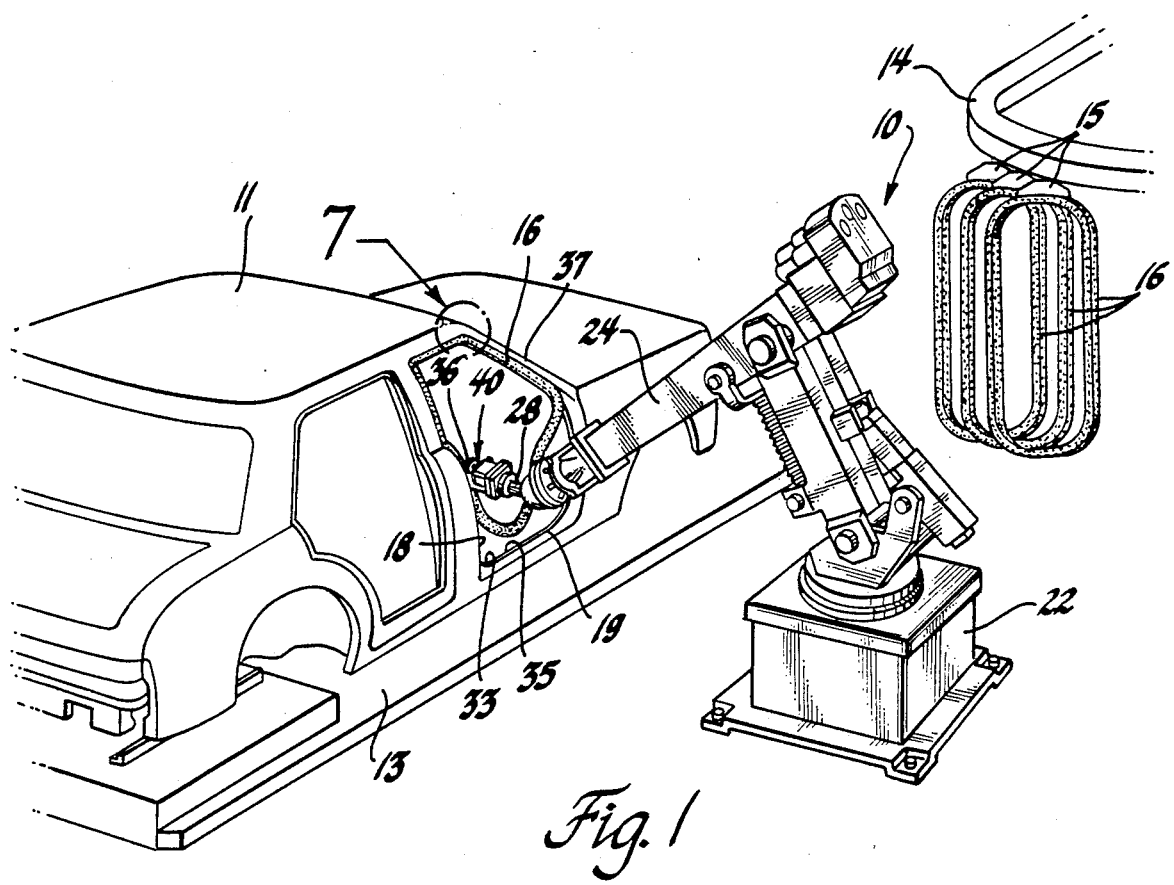
FIG. 1 is a perspective view of the robot of the present invention in a factory environment.

Referring to FIG. 1, a six axes robot 10 is located adjacent the side of the vehicle body 11. The vehicle 11 is moved along on a conveyor line or by an automatic guided vehicle 13. A weather stripping loading station is provided by carousel or conveyor line 14 adjacent to the robot 10. The conveyor line 14 carries a series of presentation fixtures or hangers 15 on which are stored two separate fixed length closed loops of weather stripping 16 (only one loop per hanger is shown for clarity of illustration). The robot 10 as will be described later will load the weather stripping 16 from the conveyor line 14 and then transfer the weather stripping to the vehicle 11. The robot 10 will then install the weather stripping 16 by interacting with the vehicle door opening 18 to affix the weather stripping 16 therein.

The robot 10 is supported on a pedestal 22 and has an arm 24 movable in both horizontal and vertical planes for universal movement. At the end of the arm 24 is an EOAT device 40 which allows the robot 10 to pick up the weather stripping 16 and to affix the same to the opening 18.

Figure 2:
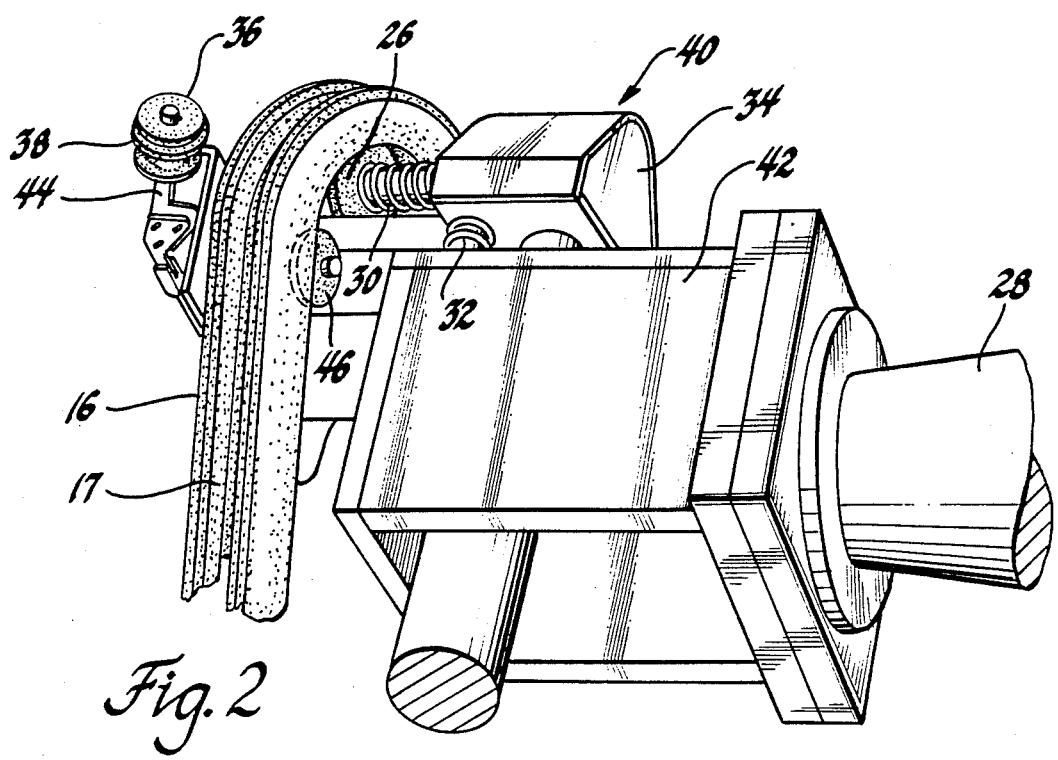
FIGS. 2, 3 and 4 are partial perspective views of the EOAT of the robot of the present invention loading the weather stripping from the loading station.
Figure 3:
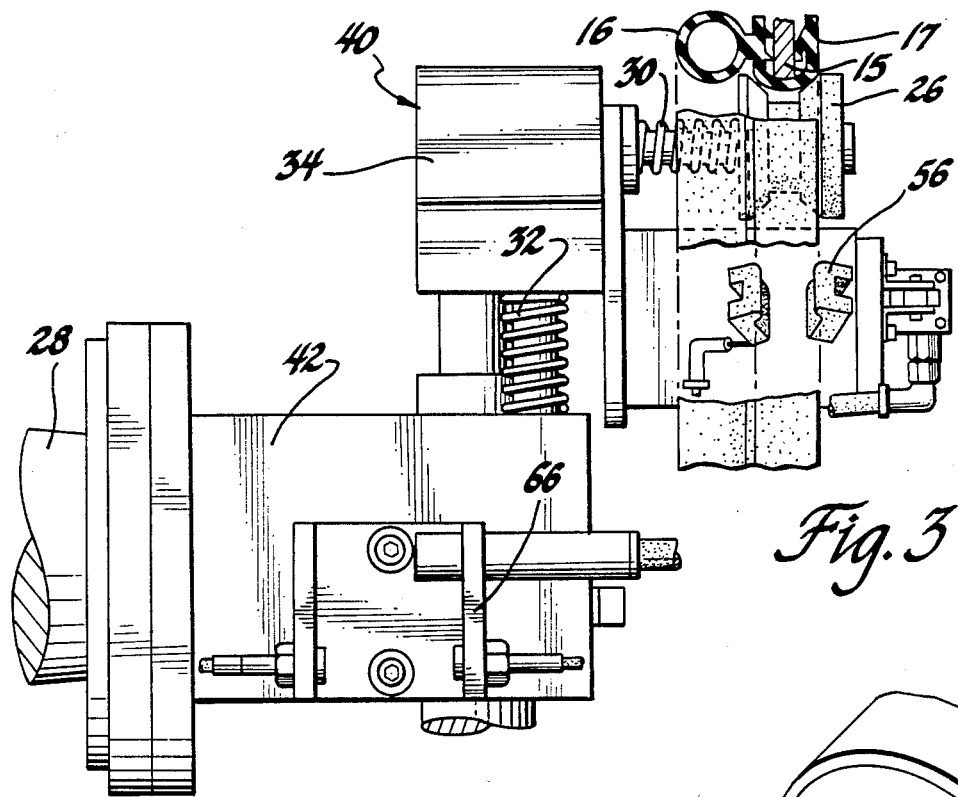
Figure 4:
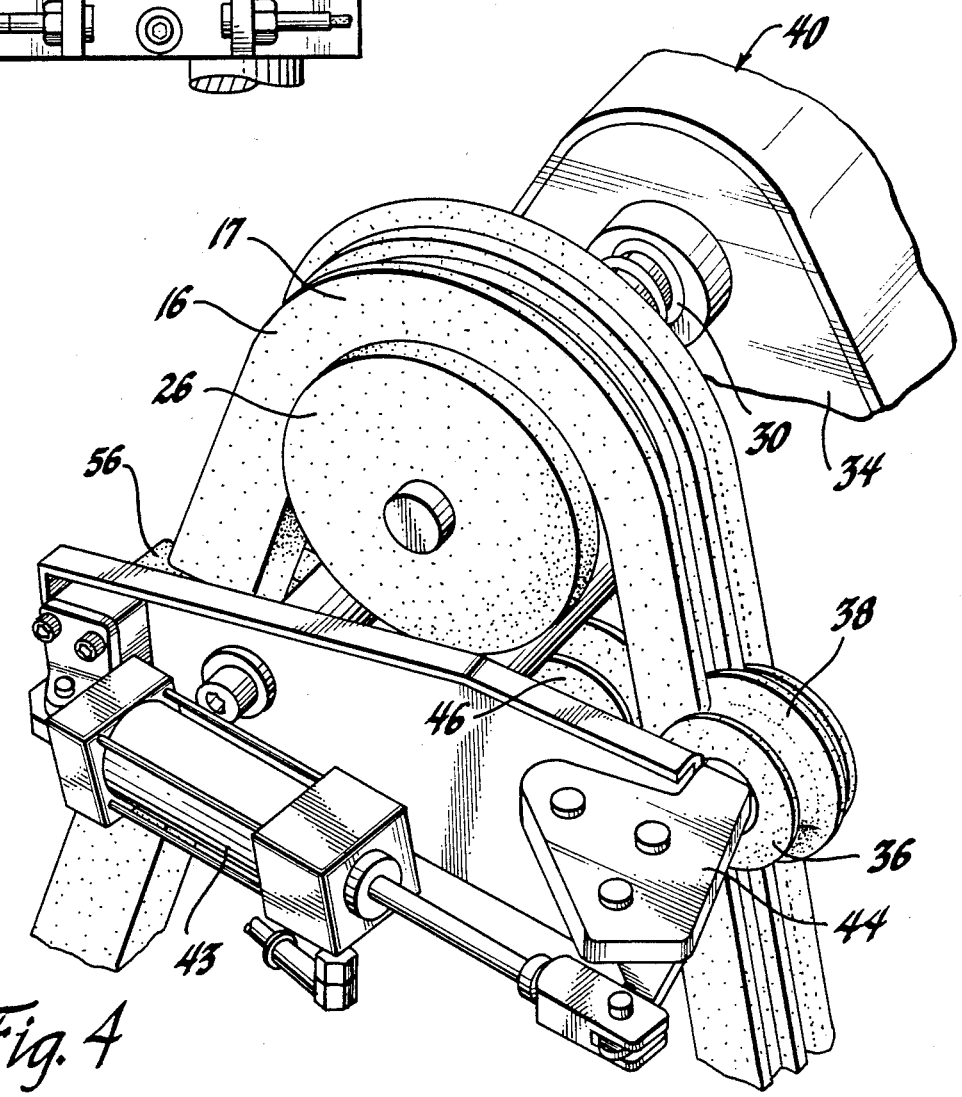
Figure 5:
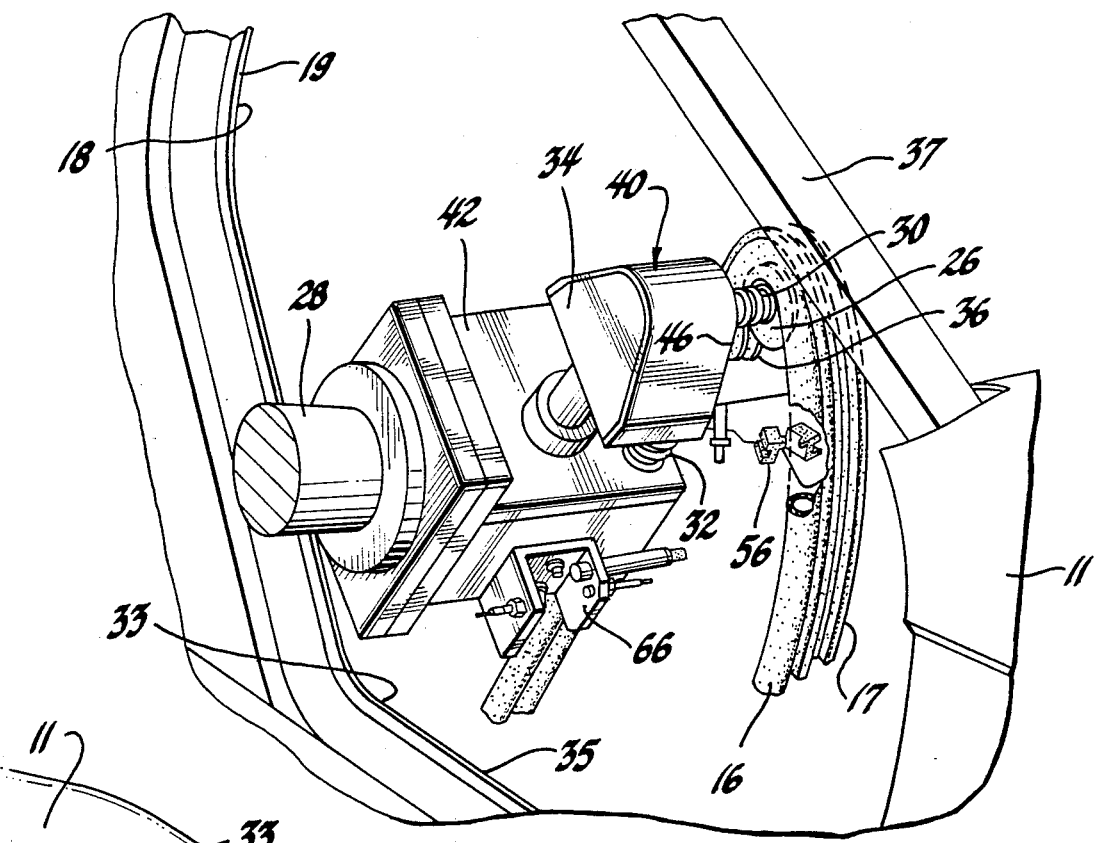
FIG. 5 is a perspective view illustrating the robot installing the weather stripping within the vehicle door opening during the initial stages of installation.
Figure 6:
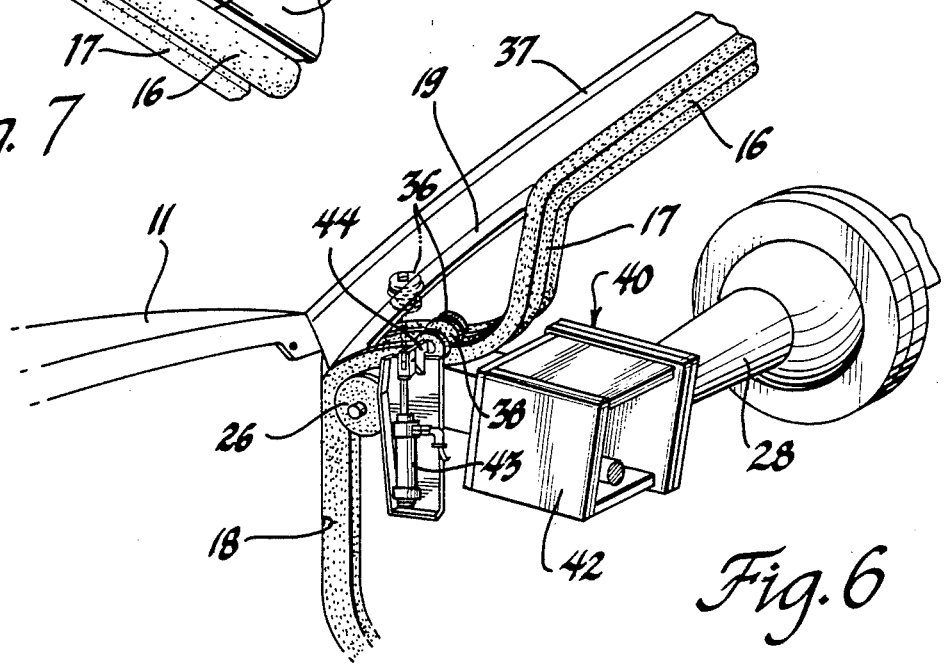
FIG. 6 is a perspective view illustrating the robot installing the weather stripping in the vehicle door opening towards the end of the installation.

Referring to FIGS. 2, 3 and 4 the EOAT frame 42 has rotatably mounted thereon a pressure roller 26. The pressure roller 26 provides the means to guide and seat the weather stripping 16 to affix the weather stripping 16 to the vehicle opening 18. The pressure roller is powered for rotation and is provided with compliance in two perpendicular axes with respect to the robot arm 24 by springs 30 and 32. The compliance is provided to allow for adjustments in the location of vehicle 11, the location of the opening 18, and the location of the opening flange 19 (FIGS. 1, 5 and 6). Also, the pressure roller 26 has a clutch 34 providing it with variable rotational velocity. The variable rotational velocity allows the robot 10 via the pressure roller 26 to trace the vehicle opening 18 at a faster rate along the straight sections such as section 35 (FIG. 5) and at a slower rate along the corners or curve like section 33 (FIG. 5).

To align the weather stripping 16 with the pressure roller 26 there is provided a guide roller 36. The guide roller 36 is also rotatably mounted to the EOAT frame 42. The guide roller 36 has a first position wherein it has a center blade 38 engaged with the weather stripping 16 opposite the pressure roller 26. EOAT 40 has an air cylinder 43 and a pivotally connected lever 44 (FIG. 4) to translate the guide roller 36 to a second position out of engagement with the weather stripping 16. (FIGS. 2 and 6 in phantom). The second position is provided to allow loading of the weather stripping 16 to the robot 10 or to release the weather stripping 16 (FIG. 6 phantom) during the final stages of installation.

Opposite the weather stripping 16 from the guide roller 36 is an idler roller 46 which is rotatively mounted to the EOAT frame 42. The function of the idler roller 46 is to cooperate with guide roller 36 in alignment of the weather stripping 16 with the pressure roller 26.

The EOAT 40 has a means to load the arm 24 with weather stripping 16 from conveyer 14 provided by a selectively operable gripper 56. The gripper 56 allows the robot 10 to grab the weather stripping 16 from conveyor 14 and transfer the weather stripping 16 to the opening 18.

In operation, the hangers 15 are loaded with weather stripping 16 manually or by a machine by placing the U-shaped portion of the weather stripping (commonly referred to as the carrier) onto the hanger. The robot 10 positions the EOAT 40 in the proximity of the conveyer line 14. A sensor, not shown, located on the conveyor line 14 determines if a ring of weather stripping 16 is present on the hanger 15 and signals the robot's controller the location of weather stripping 16. After receiving the signal of the presence and location of the weather stripping 16, the robot 10 then positions the pressure roller 26 vertically upwards to contact the weather stripping 16 (FIG. 3, note portions of hanger 15 are deleted for clarity of illustration) with the carrier 17 of the weather stripping 16 away from the robot wrist 28. The EOAT is then rotated via the wrist 28 to allow the gripper 56 to grab the weather stripping 16. EOAT 40 is then rotated in the opposite direction (FIG. 2, hanger 15 deleted for clarity of illustration) to bring the idler roller 46 into contact with the weather stripping 16. An air cylinder 43 then activates the lever 44 (FIG. 4 with hanger 15 deleted for clarity of illustration), translating the guide roller 36 to a position of engagement with the weather stripping 16. Robot 10 then moves EOAT 40 away from the hanger 15 thereby completing the loading of the arm 24. If desired, the sequence of operation of the grippers 56 grabbing weather stripping 16 and the guide roller 36 moving from its second to first position can be reversed in the loading of the weather stripping 16 to the arm 24.

Robot 10 then transfers the weather stripping 16 towards the opening 18 (FIG. 5). Robot 10 first positions the EOAT 40 in such a position that the EOAT mounted sensor 66 can confirm the location of the opening 18. Also the gripper 56 will now be actuated to release the weather stripping 16.

Figure 7:
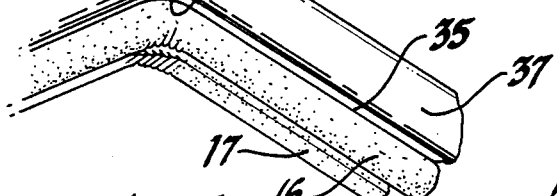
FIG. 7 is an enlarged view of the area encircled in FIG. 1.

Installation may start anywhere, however it is preferable to start on the A pillar 37 of the opening 18 and then proceed in an upward direction. Robot 10, via the arm 24 and the wrist 28 will then cause the pressure roller 26 to trace the inner periphery of the door opening 18 along the flange 19, guiding and affixing the carrier 17 of the weather stripping to the flange 19 of the opening 18. Robot 10 may be programmed to move at a faster pace along the straight sections 35 and at a slower pace along the corner 33 to insure an even installation of the weather stripping 16. As mentioned previously, the rotational speed of the pressure roller 26 will be varied to provide for the changes in linear installation speed. The rotational speed of the pressure roller 26 can be modified by selectively engaging or disengaging the pressure roller 26 from a motor 39 powering the pressure roller. When installing oversized fixed lengths it has been found to be advantageous to allow the pressure roller 26 to free wheel along the straight sections 35. Therefore the rotational speed of the pressure roller 26 will largely be a function of the linear speed of the robot 10 (via EOAT 40). As the EOAT 40 approaches the corner 33, EOAT linear speed slows down. Clutch 34 now engages pressure roller 26 with its powered motor 39 and the pressure roller 26 obtains a rotational speed even greater than its rotational speed along the straight section 35. The slower linear speed of EOAT 40 and the higher rotational speed of pressure roller 26 causes the weather stripping 16 to be selectively applied and affixed to the corner section 33 (FIG. 7) in a linearly compressed manner. Therefore the slack in the weather stripping 16 is taken up where it is needed most, in the corner sections 33. After leaving the corner, clutch 34 again disengages and pressure roller 26 again free wheels along the next straight section 35. EOAT 40 linear speed will return to its higher state.

It has been found that longitudinal compression of weather stripping 16 is a function of the relative velocity of a point on the periphery of the pressure roller 26 in relationship to a point on body opening 18. Therefore the longitudinal compression of weather stripping 18 is also a function of the rotational velocity of pressure roller 26. Generally, an increase in the rotational velocity of pressure roller 26 causes an increase in the longitudinal compression of weather strip 16.

As the installation nears completion (Figure 6), the guide roller 36 will be translated to its second position (phantom) to prevent it from pulling away the prior installed weather stripping 16. The installation can now be completed as the pressure roller 24 moves up the A pillar 37. The robot 10 will now return to conveyor 14 to be reloaded and the next opening or vehicle is brought into place.

The present invention provides a method for utilizing a robot 10 with an arm 24 having a pressure roller 26 to install a loop of weather stripping 16 stored in a loading station (conveyor) 14 to a vehicle opening 18, the method including the following steps:

1. Loading the robot arm 24 with a loop of weather stripping 16;
2. Transferring the weather stripping 16 from the loading station 14 to the vehicle opening 18;
3. Interacting the pressure roller with the opening 18 of the vehicle body whereby the weather stripping 16 is guided and affixed with the opening 18 of the vehicle body.

The present invention also provides a method of loading an arm 24 of a robot 10 with a loop of weather stripping 16 from a loading station 14 wherein the robot has an EOAT 40 with a pressure roller 26 and guide roller 36 having a first position of engagement with the weather stripping and a second position out of engagement and a selectively operable gripper 56 to grab the weather stripping 16, the method including the following steps:

1. Engaging the weather stripping 16 with the pressure roller 26;
2. Closing the gripper to grab the weather stripping 16, and translating the guide roller 36 from the second to the first position whereby the weather stripping is loaded to the robot arm 24.

The present invention provides a method for utilizing a robot 10 with an arm 24 having a variable rotational velocity powered pressure roller 26 to install oversized fixed lengths of weather stripping 16, stored in a loading station (conveyor) 14, to a body opening 18 including generally straight sections 35 and corner sections 33 cumulatively linearly shorter than the fixed length of the weather stripping, the method including the following steps:

1. Loading the robot arm 24 with one of said fixed lengths 16;
2. Transferring the fixed length 16 from the loading station 14 to the body opening 18;
3. Interacting and tracing pressure roller 26 along a straight section 35 at a first linear speed and at a first rotational speed and interacting and tracing the pressure roller 26 along a corner section 33 at a second linear speed lower than the first linear speed and at a second rotational speed greater than the first rotational speed whereby the fixed length 16 is guided and affixed with the sections 33, 35 as the fixed length is installed into the body opening 18 and whereby the portion of the fixed length of weather stripping exceeding the linear length of the body opening 18 is installed in a linearly (or longitudinally) compressed manner at the corner section 33.

The present invention is advantageous in that it allows the use of weather stripping with a carrier having a more narrow opening. Therefore the weather stripping will adhere to the flange of the vehicle body opening better. Narrow carrier openings make manual installation more difficult and therefore have been avoided in the past. The weather stripping 16 also has added a small piece of metal reinforcement in the end-to-end joint of the closed loop fixed length. Furthermore, it has been found that the weather stripping 16 works better when fabricated with a slightly more rigid elastomeric material than that normally used in the manual applications with a durometer rating held between 65-70 instead of the range of 60-70 allowed in the manual applications. However, even with all of the above noted modifications, the weather stripping 16 used in robotic applications can still be used in manual installation systems.

The present invention is being described in regard to automotive vehicle body openings, however the various applications of the present invention extend beyond automotive vehicle body applications.

A few of the embodiments of the present invention have been explained. However, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A method for utilizing a robot with an arm and a variable rotational velocity pressure roller to install fixed lengths of weather stripping, stored in a loading station, into a body opening including generally straight sections and corner sections, said method in combination comprising:
    loading said robot arm with one of said fixed lengths;
    transferring said fixed length from said loading station to said body opening;
    interacting and tracing said pressure roller along a straight section at a first linear speed and at a first rotational speed and interacting and tracing said pressure roller along a corner section at a second linear speed differing from said first linear speed and at a second rotational speed differing from said first rotational speed whereby said fixed length is guided and affixed with said sections as said fixed length is installed into said body opening.

2. A method as described in claim 1 wherein said first linear speed is greater than said second linear speed and said first rotational speed is greater than said second rotational speed.

3. A method as described in claim 1 wherein said first linear speed is greater than said second linear speed and said first rotational speed is less than said second rotational speed.

4. A method for utilizing a robot with an arm having a variable rotational velocity powered pressure roller to install oversized fixed lengths of weather stripping, stored in a loading station, to a body opening including generally straight sections and corner sections cumulatively linearly shorter than said fixed length of said weather stripping, said method in combination comprising:
    loading said robot arm with one of said fixed lengths;
    transferring said fixed length from said loading station to said body opening; and
    interacting and tracing said pressure roller along a straight section at a first linear speed and at a first rotational speed and interacting and tracing said pressure roller along a corner section at a second linear speed lower than said first linear speed and at a second rotational speed greater than said first rotational speed whereby said fixed length is guided and affixed with said sections as said fixed length is installed into said body opening and whereby the portion of said fixed length of weather stripping exceeding the linear length of said body opening is installed in a linearly compressed manner at said corner sections.

5. A method for utilizing a robot with an arm having a variable rotational velocity motor powered pressure roller, including a clutch to selectively engage or disengage said pressure roller with said motor, to install one to three percent oversized fixed lengths of weather stripping, stored in a loading station, to a body opening including generally straight sections and corner sections cumulatively linearly shorter than said fixed length of said weather stripping, said method in combination comprising:
    loading said robot arm with one of said fixed lengths;
    transferring said fixed length from said loading station to said body opening; and
    interacting and tracing said pressure roller along a straight section at a first linear speed and said clutch disengaging said pressure roller from said motor allowing said pressure roller to free wheel at a first rotational speed and interacting and tracing said pressure roller along a corner section at a second linear speed slower than said first linear speed and said clutch engaging said pressure roller with said motor powering said pressure roller at a second rotational speed greater than said first rotational speed whereby said fixed length is guided and affixed with said sections as said fixed length is installed into said body opening and whereby the portion of said fixed length of weather stripping exceeding the linear length of said opening is installed in a linearly compressed manner at said corner sections.

6. A method for utilizing a robot with an arm and a variable rotational velocity pressure roller thereon to install a fixed length of weather stripping into a body opening including generally straight sections and corner sections, said method in combination comprising:

interacting and tracing said pressure roller along a straight section at a first linear speed and at a first rotational speed and interacting and tracing said pressure roller along a corner section at a second linear speed differing from said first linear speed and at a second rotational speed differing from said first rotational speed whereby said fixed length is guided and affixed with said sections as said fixed length is installed by said robot into said body opening.

7. A method as described in claim 6 wherein said first linear speed is greater than said second linear speed and said first rotational speed is greater than said second rotational speed.

8. A method as described in claim 6 wherein said first linear speed is greater than said second liner speed and said first rotational speed is less than said second rotational speed.

9. A method for utilizing a robot with an arm having a variable rotational velocity powered pressure roller to install an oversized fixed length of weather stripping to a body opening including generally straight sections and corner sections cumulatively linearly shorter than said fixed length of said weather stripping, said method in combination comprising:

interacting and tracing said pressure roller along a straight section at a first linear speed and at a first rotational speed and interacting and tracing said pressure roller along a corner section at a second linear speed lower than said first linear speed and at a second rotational speed greater than said first rotational speed whereby said fixed length is guided and affixed with said sections as said fixed length is installed into said body opening and whereby the portion of said fixed length of weather stripping exceeding the linear length of said body opening is installed in a linearly compressed manner at said corner sections.

10. A method for utilizing a robot with an arm having a variable rotational velocity motor powered pressure roller, including a clutch to selectively engage or disengage said pressure roller with said motor, to install one to three percent oversized fixed lengths of weather stripping, stored in a loading station, to a body opening including generally straight sections and corner sections cumulatively linearly shorter than said fixed length of said weather stripping, said method in combination comprising:

interacting and tracing said pressure roller along a straight section at a first linear speed and said clutch disengaging said pressure roller from said motor allowing said pressure roller to free wheel at a first rotational speed and interacting and tracing said pressure roller along a corner section at a second linear speed slower than said first linear speed and said clutch engaging said pressure roller with said motor powering said pressure roller at a second rotational speed greater than said first rotational speed whereby said fixed length is guided and affixed with said sections as said fixed length is installed into said body opening and whereby the portion of said fixed length of weather stripping exceeding the liner length of said opening is installed in a linearly compressed manner at said corner sections.

* * * * *